Figure 5:
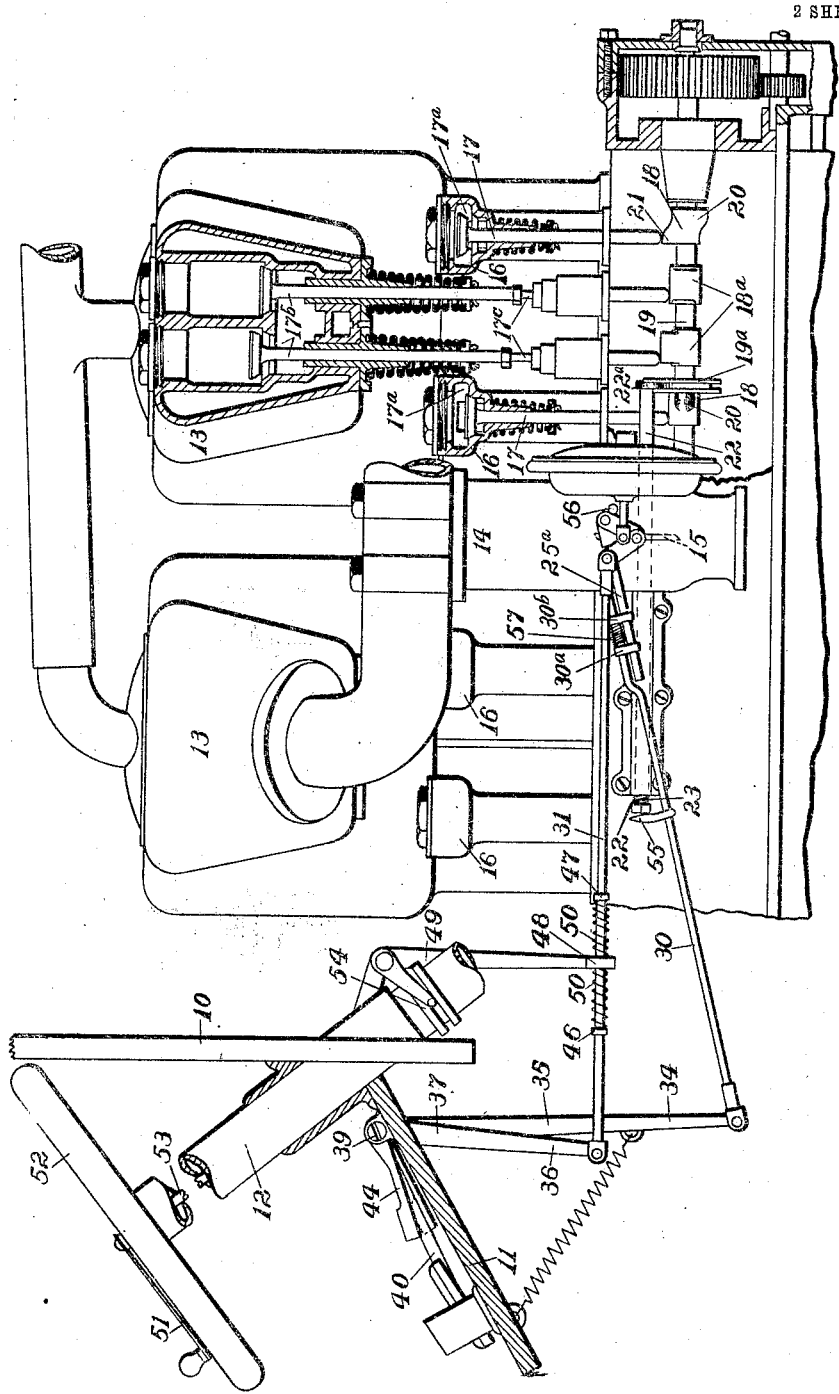

M. TIBBETTS.
MOTOR VEHICLE.
APPLICATION FILED MAY 13, 1911.
1,097,778.
Patented May 26, 1914.
2 SHEETS—SHEET 1.
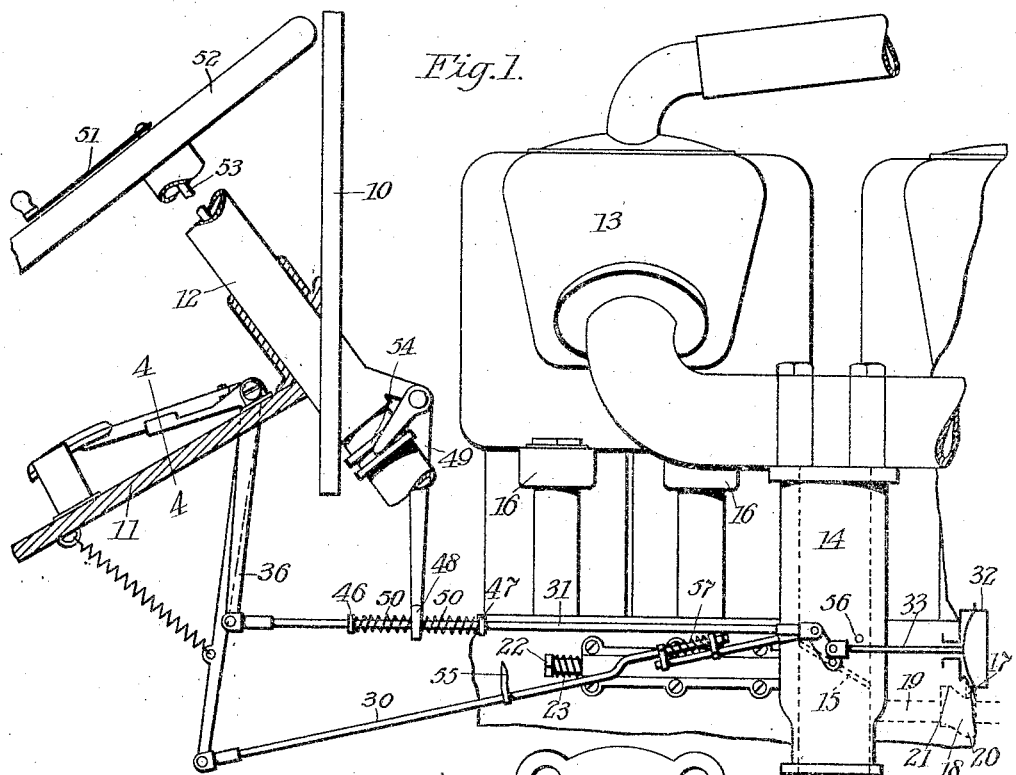
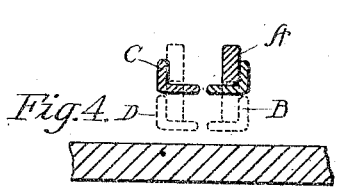
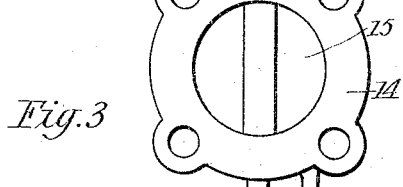
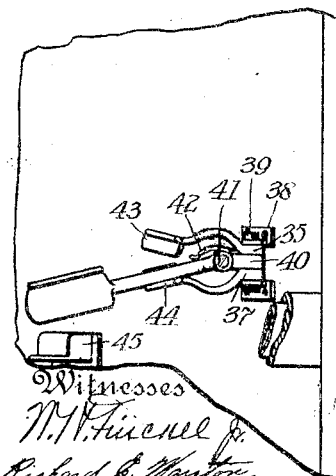
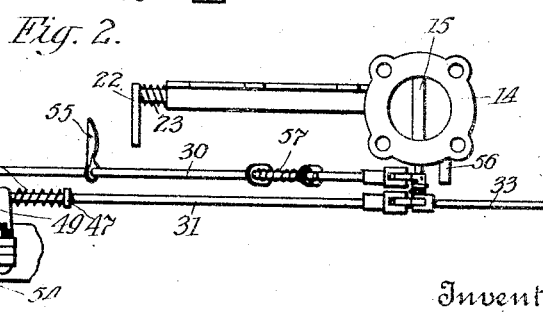
Inventor
Milton Tibbetts.
Witnesses

M. TIBBETTS.
MOTOR VEHICLE.
APPLICATION FILED MAY 13, 1911.

1,097,778.

Patented May 26, 1914.
2 SHEETS—SHEET 2.

Witnesses:

Inventor:
Milton Tibbetts.

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,097,778.   Specification of Letters Patent.   Patented May 26, 1914.

Application filed May 13, 1911. Serial No. 627,029.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles, and particularly to the mechanism for controlling the quantity and quality of the mixture passing into the cylinders and forming the explosive charge of the hydrocarbon engine with which the vehicle is provided.

Most motor vehicles of today are provided with a hand lever and a pedal lever connected to control the motor throttle valve or other mixture-regulating device. Usually the hand control lever is mounted on the vehicle steering wheel and the pedal lever is usually mounted for convenient operation, in a vertical plane, by the foot of the operator. Usually also the hand lever is so arranged that it may be set in any desired position to maintain a uniform motor speed, while the pedal lever, which is sometimes termed the accelerator pedal, is arranged to be retracted by a spring so that it will return to normal position when released by the operator's foot. In some vehicles also the governor is so connected with the control mechanism that it acts against the opening of the throttle valve, and in practice it is found that this action of the governor when working directly against the accelerator pedal causes some fatigue to the operator, particularly in long, hard runs where it is necessary to hold the accelerator pedal down the greater part of the time.

In the state of the art previous to this invention the maximum power of the motor has been obtainable by a single movement of either the hand throttle or the accelerator pedal and because of this it is found that the motor is frequently abused by a too sudden opening of the throttle when starting or "picking up."

One of the objects of the present invention is to so construct and arrange the vehicle motor control mechanism that in order to obtain the maximum power of the motor the operator must first move the accelerator pedal laterally and then depress it to its fullest extent, thus selecting the motor control device that will give this maximum power as distinguished from another motor control device which is normally operated by the accelerator pedal and which gives a lesser percentage of the motor's power.

Another object of the invention is to so construct the accelerator pedal and arrange its connections with the motor control devices that the operator may, by moving the pedal laterally against a restraining spring, cut out the governor entirely so that the throttle may be opened without any interference whatever on the part of the governor.

The invention is shown as applied to that type of hydrocarbon motor in which, in addition to the regular supply of combustible mixture taken in through the carbureter and the main intake port, a charge of air or other gas is admitted under pressure, from the crank case or elsewhere, to the cylinders at the end of the intake stroke, this additional charge usually being termed an augmenting charge, and where air is so admitted, the scheme is carried farther and a similar charge of air is admitted at the end of the firing stroke for the purpose of scavenging the cylinder, but it is not necessarily limited in its use to this type of motor.

An object of the present invention is to so construct the motor control mechanism of a vehicle motor of the type described in the foregoing paragraph, that the principal motor charge may be controlled by the simple depression of the accelerator pedal, and perhaps by the hand throttle lever, and the augmenting charge may be controlled by the same pedal after it has been moved laterally against the action of a restraining spring. By such mechanism the augmenting charge is not fed into the motor unawares as might be done in case the accelerator pedal was connected to actuate the augmenting device by a simple depression thereof.

Other objects of the invention will appear in connection with the following description and upon reference to the drawings forming a part of this specification and which may be briefly described as follows:

Figure 1 is a side elevation and part section of the forward part of a motor vehicle including the motor and its control mechanism; Fig. 2 is a plan view of the control mechanism shown in Fig. 1; Fig. 3 is an enlarged plan view of the motor intake pipe and the throttle valve and its operating arms; Fig. 4 is a section on the line 4—4 of Fig. 1; Fig. 5 is a view similar to Fig. 1, showing some of the control devices in a different position, and illustrating more of the operating parts of the motor.

Referring to the drawings the motor vehicle dash is illustrated at 10 and the diagonal floor board connected with the dash is shown at 11. The steering column 12 is suitably supported on the dash and the motor 13 is arranged forwardly of the dash as usual. 14 is the motor intake pipe or mixture chamber and the throttle valve 15 is shown in dotted lines therein.

The motor illustrated herein is of that type hereinabove referred to in which a charge of air or other gas is admitted under pressure from the crank case or elsewhere for the purpose of augmenting the regular charge taken in through the main intake valves.

In Figs. 1 and 5, 16 are the valve casings for the augmenting valve 17, operated by cams 18 on the cam shaft 19 which is driven from the motor crank shaft by a two-to-one gearing. These valves control passages 17$^a$ extending from the crank case to the cylinder. If desirable, push rods may be used between the cams and the lower ends of the valves to adjust for wear. As shown, these cams are each formed with two rises 20 and 21, arranged in different transverse planes and at approximately 180° apart. The rise 20 is adapted to regulate the scavenging action of the valve 17 and the rise 21 is adapted to regulate the augmenting action thereof. In the above brief description it will be seen that by shifting the cam shaft 19 axially the rise 20 will be gradually thrown out of operation and the rise 21 will be brought into operation, thus decreasing the scavenging and increasing the augmenting action of the valve 17. This axially shiftable movement of the cam shaft 19 is accomplished by a push rod 22 yieldably held by the spring 23 in the position shown in Fig. 1 so that the rise 20 is in operative position. The rod 22 is connected to the shaft 19 by a yoke 22$^a$ on the rod and an annular groove 19$^a$ in the shaft so that the shaft may be moved lengthwise by the rod. A movement of the push rod 22 to the right therefore will shift the cam shaft 19 in the same direction and bring the augmenting rise 21 of each of the cams 18 into action. In Fig. 5 the inlet valves 17$^b$ are shown, being operated through push rods 17$^c$ and cams 18$^a$ on the cam shaft 19. These cams are made long enough to operate continuously, regardless of the longitudinal position of the shaft. The throttle valve 15 is mounted on a shaft 24 to which is keyed an operating arm 25 and upon the outer end of which is loosely mounted a second operating arm 26, and the arms 25 and 26 are connected by a coil spring 27 adapted to hold the arms yieldingly in the relative positions in which they are shown in Fig. 3 with the stop 28 on arm 26 and the stop 29 on the arm 25 acting to prevent relative movement of the arms in one direction. This spring 27 is very light, being heavy enough only to resist any unbalancing of the throttle valve 15 caused by the passage of the gases around the same. The arms 25 and 26 are connected to be operated by separate devices, the operating rod 30 being pivoted to the arm 25 and the operating rod 31 being pivoted to the arm 26. The arm 26 is also connected to be controlled by a governor 32 through rod 33, the governor shown being of the hydraulic type, and acting to close the throttle as the motor speed increases. The operating rod 30 is connected to an arm 34 of a bell crank lever 35 and the operated arm 31 is connected to an arm 36 of a bell crank lever 37, which levers are mounted in a suitable bracket 38 on the floor board 11 on a pivot 39 coincident with the pivot of a foot lever or accelerator pedal 40, this accelerator pedal preferably being mounted between the bell crank levers. The accelerator pedal 40 is formed in two parts pivoted together at 41 to permit the free end of the pedal to be moved laterally against the action of a restraining spring 42 for the purpose of bringing the pedal into operative relation with either of the arms 43 and 44 of the bell crank levers 35 and 37 respectively.

From the above description it will be seen that the spring 42 holds the free end of the accelerator pedal 40 in operative relation with the arm 44 whereby the latter arm may be moved downwardly by depressing the accelerator pedal thus rocking the bell crank lever 37 on its pivot; or the accelerator pedal may be moved laterally against the spring 42 to operative connection with the arm 43 whereby said arm may be depressed thus rocking the bell crank lever 35 upon its pivot. Various positions of the accelerator pedal and the arms 43 and 44 are shown in Fig. 4, position "A" being the normal and inoperative position of the pedal. In position "B" the arm 44 is fully depressed; in position "C" the accelerator pedal has been moved to operative relation with arm 43; and in position "D" the accelerator pedal has fully depressed arm 43.

For convenience in operating the accelerator pedal a foot rest 45 may be provided on the floor board adjacent the normal position of the pedal. In addition to the pedal mechanism for operating the rod 31, the latter may be provided with spaced stops 46 and 47 between which the yoked end 48 of a bell crank lever 49 may be positioned. Springs 50 are arranged between the yoked end and each of said stops. The bell crank lever 49 is controlled by a hand lever 51 preferably mounted on the steering wheel 52 and connected through rod 53 and a suitable worm to the sleeve 54 and lever 49. Thus it will be seen that the operating rod 31, and hence the throttle valve 15 may be yieldingly set in any desired position by the hand lever 51 and the throttle valve may be shifted therefrom by the accelerator pedal as above described. The operating rod 30 is adapted to travel adjacent the push rod 22 and it is provided with an abutment 55 which is adapted to contact with the push rod 22 at about the point in the operation of the rod 30 that the throttle arm reaches its stop 50 which marks the full open position of the throttle valve 15. By means of a spring device 57 in the rod 30, the latter may be moved farther to shift the push rod 22 and its cam shaft 19 while at the same time retaining the throttle in wide open position. This spring 57 is arranged on the rod 30 between a stop 30ª on the rod 30 and a stop 30ᵇ on a rod 25ª connected directly to the arm 25, which latter it will be understood is keyed to the shaft 24 of the throttle. In this connection it will be further understood that the spring 57 is somewhat stronger than the spring 27 so that the resistance of the latter is easily overcome without compressing the spring 57 to any extent. Thus the throttle may be opened by the rod 30 through the arm 25 without materially changing the position of the arm 26 or the governor and rods connected to said arm 26.

It will be noted that the arm 34 is longer than the arm 36 thus making the travel of the rod 30 greater than that of rod 31 with no increase in the travel of arm 43 over that of arm 44. It will further be seen that the rod 31 operates the throttle 15 through the stops 28 and 29, the keyed arm 25 and shaft 24, carrying along with the rod 30, and this movement of the rod 31 is resisted by the action of the governor 32 as the motor speed increases; whereas the rod 30 acts directly upon the keyed arm 25 to open the throttle valve 15 through the shaft 24 and the action of the governor 32 is absorbed by the spring 27 so that the rod 31 and arm 26 are not necessarily carried along with the arm 25. Thus the only resistance to the opening of the throttle by means of the rod 30 is the spring 27 and the light spring which retracts the arm 34, and as these springs are preferably made very light no fatigue is experienced in holding the throttle open for long periods of time.

The above arrangement is particularly advantageous when the motor vehicle is being driven through a sandy or hilly country or otherwise where it is necessary for the operator to keep the throttle open the greater part of the time with the motor operating at practically its maximum capacity, for the reason that the operator may control the throttle and augmenting means with the accelerator pedal connected with the arm 43 and the governor resistance need not be overcome by the operator's foot. It is believed that other advantages are apparent from the above description.

Having thus described my invention, what I claim is:

1. In a motor vehicle, the combination with the means for controlling the supply of mixture to the cylinders, of a pair of control rods connected to said means and either of which will act to control said mixture supply, a control lever, and means for shifting said control lever laterally to connect it with either one or the other of said control rods.

2. In a motor vehicle, the combination with the motor intake pipe, the throttle valve therein, and means for augmenting the motor fuel supply, of a motor control lever having two distinct paths of movement, and connections from said lever to said throttle valve and augmenting means whereby the movement of said lever in one of its paths operates said throttle valve without affecting the augmenting means, and the movement of said lever in its other path operates both said throttle valve and said augmenting means.

3. In a motor vehicle, the combination with the motor intake pipe and the throttle valve therein, of a control rod having a yielding connection with said valve, a governor having a yielding connection with said valve, a second control rod connected to said valve and adapted to open said valve against its yielding connection with the governor, a single control lever, and connections between said control lever and said control rods whereby either of said control rods may be operated at the will of the operator.

4. In a motor vehicle, the combination with the motor intake pipe, the throttle valve therein, and other means for varying the mixture supply to the cylinders, of a control rod connected to said throttle valve, another control rod operatively connected to said throttle valve and to said other mixture varying means, an operating lever, and means whereby either of said control rods may be operated by said lever at the will of the operator.

5. In a motor vehicle, the combination with the means for controlling the supply of mixture to the cylinders, of a pair of control rods connected to said means and either of which will act to control said mixture supply, a governor, means connecting said governor with one of said control rods such that the governor must be resisted by such control rod when the latter is moved to increase the mixture supply, a control lever, and means for connecting said control lever with either of said control rods whereby the control lever may be operated in connection with the governor or independently thereof.

6. In a motor vehicle, the combination with the motor control devices and a pair of coaxially mounted levers adapted to operate them, of a pedal lever mounted between adjacent arms of said levers and adapted to engage and depress said arms at different times, and means for yieldingly holding said pedal lever in engagement with one of said arms while permitting it to be moved laterally for engagement with the other of said arms, whereby said pedal lever is adapted to depress either of said levers at the will of the operator.

7. In a motor vehicle, the combination with the motor intake pipe, the throttle valve therein, and a pair of control rods each connected to said throttle and either of which will act to control said throttle, of a control lever, and means for connecting said control lever with either of said control rods.

8. In a motor vehicle, the combination with the motor intake pipe, the throttle valve therein, and another mixture supply control means, of a pair of coaxially mounted levers connected to operate said throttle valve and said means respectively, a pedal lever mounted between adjacent arms of said levers and adapted to engage and depress said arms at different times.

9. In a motor vehicle, the combination with the motor intake pipe, the throttle valve therein, and another mixture supply control means, of a pair of coaxially mounted levers connected to operate said throttle valve and said means respectively, a pedal lever mounted between adjacent arms of said levers and adapted to engage and depress said arms at different times, and means yieldingly holding said pedal lever in engagement with one of said arms while permitting it to be moved laterally for engagement with the other of said arms, whereby said pedal lever is adapted to depress either of said levers at the will of the operator.

In testimony whereof I affix my signature in the presence of two witnesses.

MILTON TIBBETTS.

Witnesses:
W. H. FINCKEL, Jr.,
RICHARD E. MARSTON.